Figure 1:
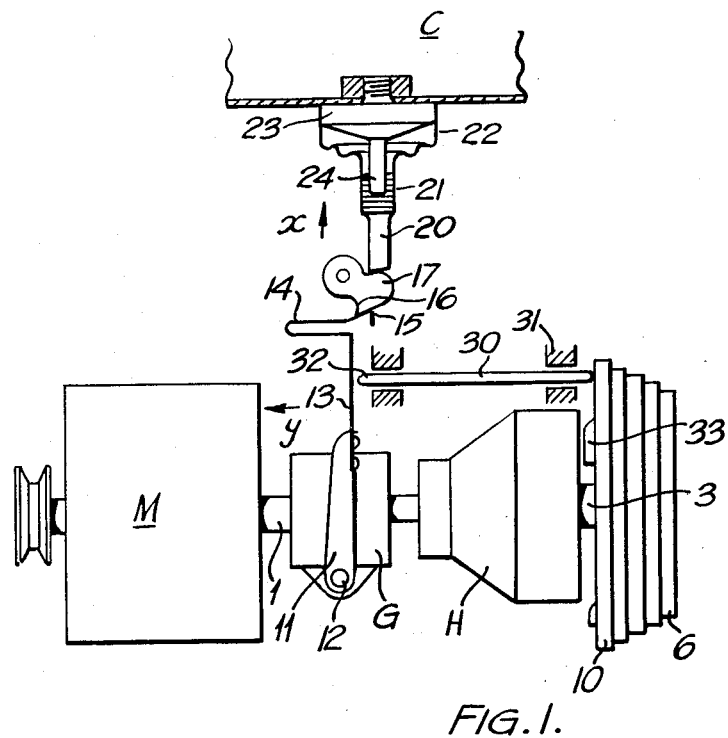

May 23, 1961 R. J. GILSON 2,985,177
AUTOMATIC TEMPERATURE RESPONSIVE TIME-CONTROL SYSTEM
Filed Jan. 23, 1958 4 Sheets-Sheet 2

Inventor:
Robert John Gilson
By his attorneys:
Baldwin & Wight

Inventor:
Robert John Gilson
By his attorneys:
Baldwin & Wight

United States Patent Office 2,985,177
Patented May 23, 1961

2,985,177
AUTOMATIC TEMPERATURE RESPONSIVE TIME-CONTROL SYSTEM

Robert John Gilson, New Malden, England, assignor to Charles Colston Limited, London, England, a corporation of the United Kingdom Filed Jan. 23, 1958, Ser. No. 710,638

Claims priority, application Great Britain Jan. 23, 1957

19 Claims. (Cl. 134—56)

This invention relates to a temperature responsive, time control system for use in a machine or plant required to perform a given cycle of operation.

In the case of a washing machine with reference to which the invention is hereinafter described in detail, the cycle of operations usually includes that of filling the washing chamber with water, washing, rinsing and emptying. It will be obvious that the timing of some of the various stages forming the complete cycle of operations will depend upon the temperature of the water, since even in the case where the machine is fitted with a heating element sufficient time has to be allowed for the water to be heated to the desired temperature.

In order to ensure adequate washing and rinsing, it is desirable that the length of the periods during which the washing and rinsing occurs are varied, a longer period being necessary if a washing machine is supplied with cold water, than if it is supplied with hot water. The optimum period is fixed according to the desired optimum water temperature.

An object of the present invention is to provide a control device and system in which the periods of washing and rinsing stages in a washing machine are varied automatically to suit any differences in e.g. supply water temperature, room temperature, washing load, etc.

According to the present invention means for automatically controlling the operating cycle of a machine in which at least one of the operations is dependent upon a predetermined temperature condition, comprises a driven element by which the cycle of operations in the machine is timed and controlled, a variable speed gear change means interposed between a constant speed drive unit and said driven element, means operated by said driven element at the commencement of the cycle or at a predetermined stage or stages therein to set the change speed gear to work at a higher or lower speed as demanded by the temperature conditions, a latch device for retaining the gear change speed means in its changed speed position so that the machine will be speeded up or slowed down accordingly until the required operating temperature of the machine is attained, and a trip mechanism associated with the latch device whereby the latter is held against displacement to prevent a return to normal operating conditions, said trip mechanism being so arranged that it only operates to release the latch device when the required operating temperature has been attained so that the drive can return to its normal position.

Figure 2:
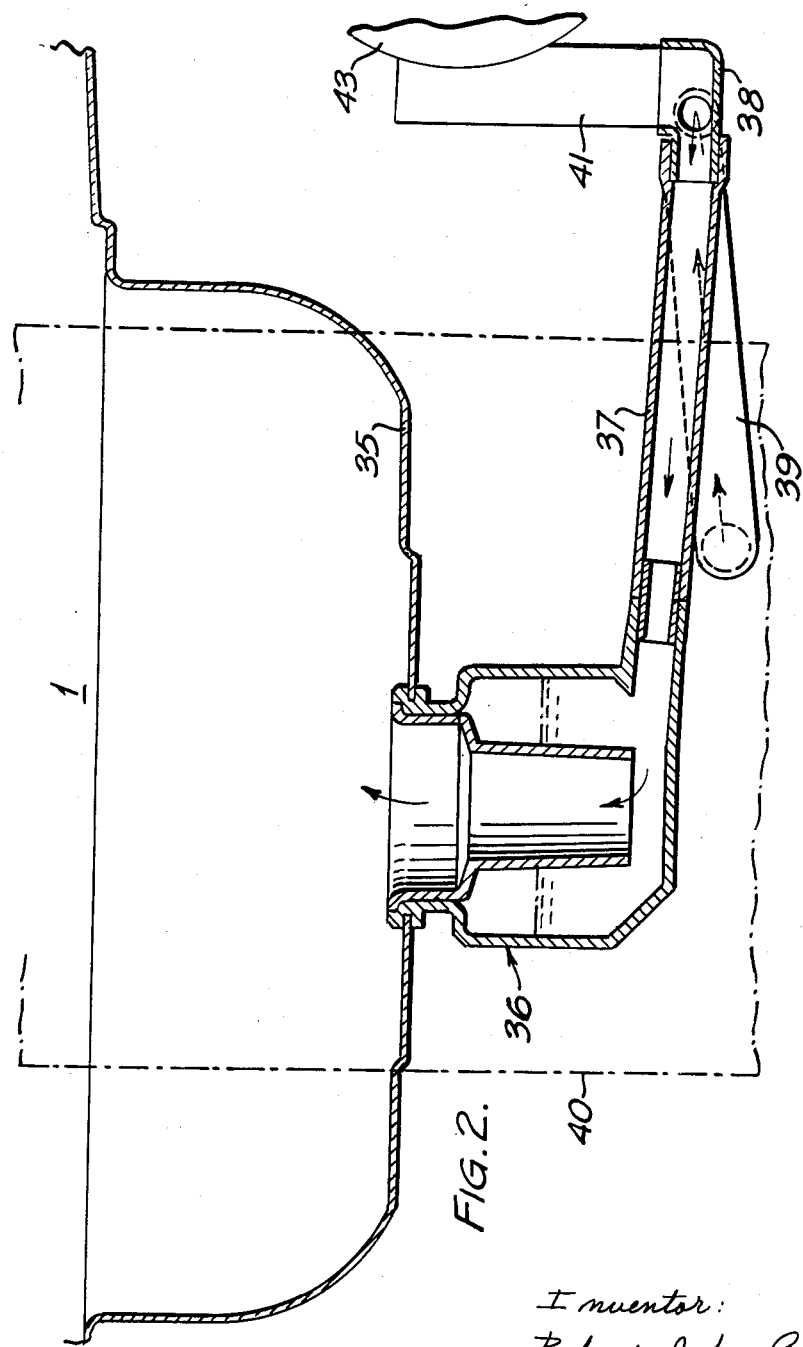
Figure 3:
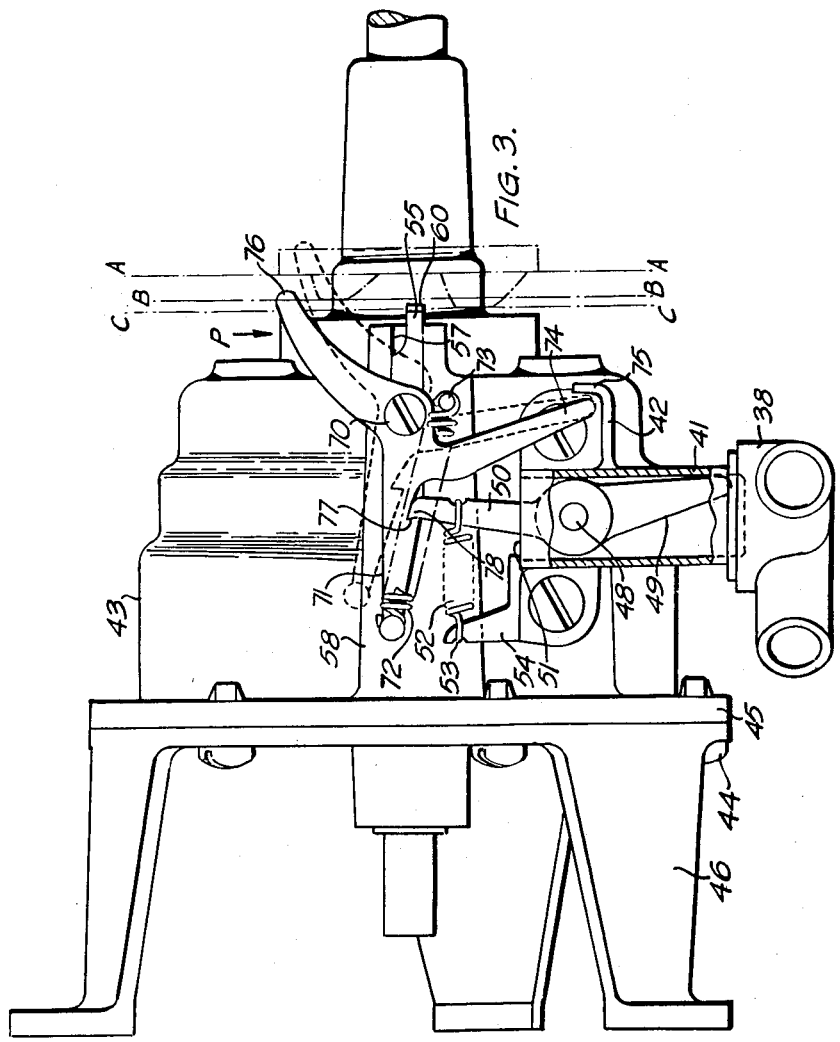
Figure 4:
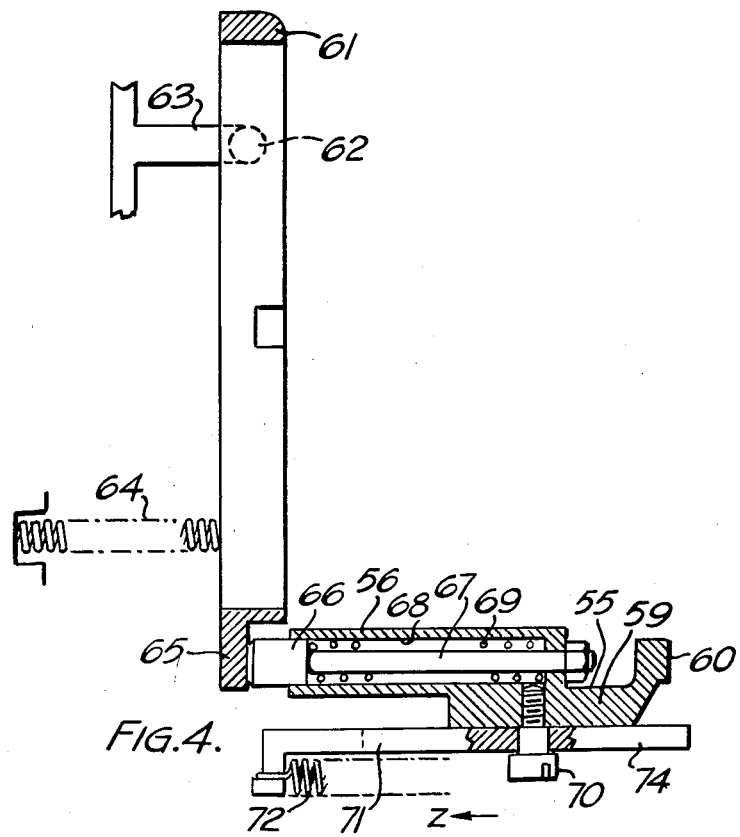
Figure 5:
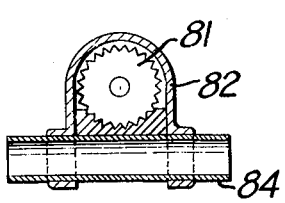
Figure 6:
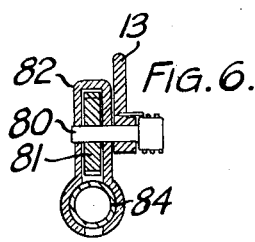

The invention is illustrated in the accompanying drawings as applied to a temperature responsive time-control system for use in a washing machine in which Figure 1 is a diagrammatic view of a temperature responsive control device designed for speeding up or slowing down a given cycle of operations in a dishwashing machine, Figure 2 is a diagrammatic sectional view of a dishwashing machine showing part of the washing chamber together with part of the liquid circulating system and a change speed gear box by which a given cycle e.g. the circulation of liquid can be lengthened or shortened, Figure 3 is a part sectional elevation showing the change speed gear box and associated timing cam and change speed gear mechanism and the bracket by which the unit is coupled to the driving motor, Figure 4 is a detail plan view showing part of the change speed gear mechanism together with the push rod which functions as the cam follower and by means of which high and low speed gears are selected, Figures 5 and 6 are sectional views of a modified form of locking mechanism by which the gears are automatically locked in their low speed drive position.

Referring more particularly to Figure 1 of the drawings, there is shown part of a washing machine including a washing chamber C in which is mounted an impeller (not shown) for producing a cleansing spray, this impeller and its method of operation being the subjects of the co-pending applications of Alfred Henry Wickham and Robert John Gilson, Serial No. 629,124 and Robert John Gilson, Serial No. 726,394. These co-pending applications are owned by the same assignee as the present application.

For the purpose of illustrating the present invention the cycle of operations in respect of which the control system of this invention has been designed, comprises the following stages:

(1) filling, followed by washing.
(2) emptying.
(3) refilling followed by rinsing.
(4) emptying.
(5) refilling followed by final rinse.
(6) drying.

It will be obvious that the period required for washing and rinsing is dependent upon the temperature of the water in the washing chamber which in turn may vary with the initial temperature of the water supply and for which reason it is customary in washing machines to provide in the washing chamber, or at a suitable position in the water circulating system, an electrical heating element. It is clear, therefore, that should the temperature of the water within the system be below a predetermined figure, the time cycle must be slowed down to allow sufficient time to enable the water to be heated to the required temperature and for this reason the present invention includes the provision of a change speed gear box capable of giving a high and low speed drive so that the washing and/or rinsing cycles can be slowed down to an extent sufficient to enable the water to be raised to the required temperature.

In Figure 1 the main driving motor is indicated at M, the output shaft 1 of which is connected through a two-speed gear box G to a series of reduction gears (not shown) mounted in a housing H, from which drive at a reduced speed is taken through a shaft 3 to a series of cams 6 to 10, these cams serving to operate the motor switch, inlet valve, outlet or drain valve, and a dispenser for injection of a detergent liquid. These cams which form no part of the present invention are associated with a fifth cam 10 by means of which the change speed gear box G is automatically operated in accordance with the invention.

As shown in Figure 1 the change speed gear box G is provided with a control lever 11 mounted to pivot about a fulcrum 12, the lever being provided with an extension arm 13 terminating in a spring arm 14 and detent 15 for co-operation with a shoulder 16 of a trip lever 17, as hereinafter explained.

Figure 1 shows the lever 11 in its high speed position, which may give a gear ratio of 1–1, a convenient ratio for the low speed drive being 20–1, the change speed mechanism and the lever 11 being biased by any suitable means, e.g. a spring so that it takes up the high speed position in which position it normally remains.

It will be observed that when in this (high speed) position, the spring arm 14 and the detent 15 are in a position of rest beneath the trip lever 17. Co-operating with the trip lever 17 is a plunger element 20 which plunger element is under the control of a fusible alloy contained in a chamber 21. The chamber 21 forms part of a larger chamber 22 within which is mounted a heat conductive spigot member 23, the spigot piece 24 of which extends into the fusible alloy within the smaller chamber 21, which is constructed in the form of a bellows so as to be capable of contraction and expansion.

In the arrangement shown in Figure 1 the fusible alloy is directly sensitive to the temperature of the water or washing liquid within the chamber C, and when, therefore, the water is below the predetermined temperature, which corresponds to the fusing temperature of the alloy, the latter remains solid and thus the plunger 20 is held fixed relative to the release lever 17. When however the prevailing temperature within the chamber C has risen to a temperature at which the fusible alloy has melted or become liquid, it will permit an upwards movement of the plunger 20 in the direction of arrow x because of the flexibility of the walls of chamber 21.

On one face of the gear change cam 10 is a series of cam lobes for co-operation with a push rod 30 slidably mounted in guides 31 and so arranged that one end of the rod lies in the path of rotation of the lobes. By arranging the number of cam lobes to correspond to the number of separate operations in each complete cycle to be controlled, it is possible automatically to provide for a change over from one speed to another i.e. from high to low at the beginning of each operation. Thus at the start of a washing operation, the angular position of the cam lobe associated with that part of the complete cycle will be such that it will contact the rod 30, which will be displaced with the result that its other end 32 will engage the extension 13 of change speed lever 11 and move it in the direction of arrow y to engage low gear drive.

Assuming, therefore, that the water is below the predetermined temperature, and that the motor is driving, drive will take place from the motor M through the change speed gear box G which will be in the high speed position as shown. This will produce rotation of the cluster of cams, one of the lobes, indicated at 33, will contact the push row 30 and move the extension arm 13 together with the gear change lever 11 to the left of the drawing in direction of arrow y and since at this time the plunger 20 is held immobile by the alloy, which will be solid, the release lever 17 will also remain stationary. Accordingly the detent 15 will move into a position behind the shoulder 16 of lever 17 to prevent lever 11 from moving back to high speed position.

So long therefore as this state of affairs holds good i.e. the water is at a temperature below the fusing temperature of the alloy in chamber 21, the change speed lever 11 will be held in its left-hand position and low gear drive engaged. Clearly, therefore, the cycle of operations is slowed down to allow the temperature responsive element in the chamber C or water circulating system to heat up the water to the required temperature. Once the water circulating in the system has reached the desired temperature, the fusible alloy within chamber 21 will melt and accordingly allow the plunger 21 to retract upwardly in the direction of arrow x; at the same time the release lever 17 will lift due to the pressure exerted by the spring blade 14 and detent 15, thus releasing the detent 15. Immediately the detent 15 escapes from the shoulder 16 of the lever 17, the extension arm 13 and the change speed lever 11 will, due to the biasing force on the gears, move back to the high speed position when once again the cycle of operations will speed up and continue at this speed for so long as the temperature within the chamber C is normal or until another cam lobe engages the push rod 30 to re-engage low gear.

In the preferred embodiment shown in Figures 2 and 3 the washing chamber C (Figure 2), is provided with a sump 35 which is connected through an airtrap indicated generally at 36 to an outflow pipe 37. Pipe 37 connects with an inlet to an elbow 38, the outlet from said elbow leading through a further pipe 39, which connects with a manifold 40 at one side of the washing chamber. This manifold 40 (shown in dot and dash lines in Fig. 2) serves as the flow path of liquid to the impeller and also houses the impeller drive, but forms no part of the present invention.

Integral with the elbow 38 is an upstanding tubular portion or chamber 41 within which is a fusible alloy. The chamber 41 containing the fusible alloy forms part of a bracket 42 (see Figure 3), which bracket is attached to a housing 43 for the change speed gear, this housing being formed at one end with a flange 45, by which it is secured by set screws 44 to a three-legged bracket 46, by means of which the entire control assembly may be bolted to the motor end frame (not shown).

The gear change lever trip mechanism in this embodiment of the invention comprises a two-armed lever mounted for rocking movements on a fulcrum pin 48 fast in the walls of chamber 41, the lever being so arranged that it is partly immersed in the fusible alloy with the result that so long as the alloy remains solid the trip lever will be held stationary. The two-armed trip lever comprises upper and lower arms 50, 49, the lower arm 49 being wholly immersed and the upper arm 50 extending through a slot 51 in the upper end wall of the chamber 41 and its free or exposed end being connected to one end of a tension spring 52, whose other end is anchored at 53 to a lug 54 on the bracket 42.

It will be seen, therefore, that the spring 52 urges the trip lever 49, 50 in an anticlockwise direction about its fulcrum 48 so that its arm 49 is stationed against the side wall of chamber 41.

The change speed mechanism comprises a slider member, indicated generally at 55, which member 55 serves a dual purpose in that one arm 56 thereof is slidably carried in a groove 57 formed in a taper rib 58 of the gear housing 43, while its other end 59 is formed with an offset portion having a cam follower face 60 for co-operation with the gear control cam 10 on which are mounted the cam lobes as previously described. Thus the slider 55 operates as a push rod to transfer movement from the cam to the gear change element, one end of arm 56 entering the gear housing 43.

Referring now to Figure 4, gear changing is effected by means of a speed change yoke or fork element 61 mounted for rocking movement about a fulcrum 62 on a bracket 63 inside the gear housing. The gear change yoke 61 is biased by means of a compression spring 64 to a position where the high gear is engaged except when the cam follower 60 is displaced to the left of the drawing in the direction of arrow z by means of the lobes of the cam 10. On one side of the yoke 61 is a flat 65 with which engages the head 66 of a plunger 67 housed in a bore 68 in the arm 56 of the slider, this plunger being urged to its operative position by means of a spring 69. This plunger, as hereinafter explained, provides a lost motion connection between the gear change arm 56 of the slider and the yoke 61.

Secured by means of a screw stud 70 to the outer face of the slider 55 is a three-armed latch lever, one arm 71 of which is connected by means of a tension spring 72 to an anchorage stud 73 on the rib 58, the effect of the spring 72 being to bias the latch in an anticlockwise direction about its fulcrum 70 so that a second arm 74 thereof, assuming the fulcrum stud 70 remains stationary, will be biassed in a direction to engage a fixed abutment 75 on bracket 42. A third arm indicated at 76, of the latch lever serves as a means of manual operation should it be necessary to disengage the latch lever by applying downwards pressure in direction of arrow P, it being understood that the end of arm 76 lies outside the perimeter of the cam 10. On the underside of the first arm 71 is a cut-out 77 for engagement with the end 78 of the trip lever 50.

The full line positions of the retaining or trip lever 50 and of the latch lever 71, 76 show the latch lever in its operative position where the latch arm 71 has been retained by engagement with the trip lever 50, and low gear has been engaged, this position of the parts corresponding to a state of affairs in the water circulating system, when the water is below the predetermined temperature and the fusible alloy within the chamber 41 is solid. The dotted line position of latch lever 71, 76 is the position it normally assumes and corresponds to the high gear drive position.

In operation, assuming that a washing operation has just commenced, that is to say, the motor circuit has been completed and the timing cams have started to revolve, the gear change control cam 10 will be revolving in a clockwise direction when one of four cam lobes corresponding respectively to wash, rinse No. 1, rinse No. 2 and drying, will strike the end 60 of the slider 55 causing a displacement of the latter in a direction to the left in Figures 3 and 4 and to a position where the change speed yoke 61 is shifted from high speed to low speed positions. Accordingly the low speed gears will be engaged because the displacement of the slider 55 is sufficient to move the arm 56 of the slider to a position where its end will engage the seating 65 (at which time the plunger 67 will be withdrawn into the interior of chamber 68 against the action of spring 69); this movement of the slider 55 is also sufficient to enable the recess 77 in arm 71 of latch lever to engage the beak 78 of the trip lever 50 when the gear change mechanism will be maintained in its low speed position.

It will be understood, therefore, that so long as the temperature in the water circulating system is below normal, or that temperature at which the fusible alloy will melt, the lever 50 will be held solid and operate as a latch to hold the latch lever 71, 76 in operative (low speed) position.

Immediately the fusible alloy melts, the trip lever 50 is freed and is capable of a clockwise movement about its fulcrum 48 against its spring 52. Assuming, therefore, that the lever 50 has been freed, the bias on the gear change mechanism controlling the high and low speed gears, which tend automatically to resume their high speed position, will allow the slider 55 to return to its normal or high speed position under the urges of the springs 72 and 64 because due to the continued rotation of the cam disc 10, the cam lobe corresponding to the washing position will have moved clear of the end face 60. Therefore the washing cycle continues at high speed.

Referring to Figure 3 there are shown three dotted lines A—A, B—B, C—C, the line A—A representing the face of the cam or zero position of the lobes. Line C—C represents the maximum cam rise or displacement which is brought about only when the cams controlling respectively the washing and second rinse cycles come into operation. Line B—B represents the total (but not the maximum) displacement obtainable when the other two cam lobes controlling respectively the first rinsing and drying cycles come into operation, this displacement being sufficient through the action of the plunger 66 to shift the yoke 61 to a position where low gear drive will be engaged but without however enabling the beak 78 of trip lever 50 to be engaged by latch arm 71.

Comparison with Figure 4 will show that the displacement of the slider bar brought about by the B—B position of the cam lobes is sufficient only to move the yoke 61 to the position where low gear is engaged. The additional movement produced by the deep face cam lobes as represented by the spacing of lines B—B, C—C and which would result in the recess 77 in latch arm 71 engaging the beak 78 of the trip lever 50 is made possible by the lost motion introduced between plunger 66 and slider arm 56. Clearly, therefore, when the two cam lobes controlling respectively the first rinsing and drying operations come into operation, although engagement of low speed gear will take place it will only be a temporary engagement, because the latch lever 71 is free together with the slider 55, to return to its inoperative or unlatched position, with the result that the low speed drive will only occur for a short period of time and be immediately followed by restoration of high speed drive.

Since it is desirable that the low speed drive should continue for a certain length of time and in order to prevent it being only instantaneous, provision can be made through the cams for maintaining the slider 55 depressed for a certain period of time. Clearly if the cam lobe is followed by a dwell section of the cam corresponding to an angular movement of 2 to 30° of one complete rotation of the cam, it will ensure that the low speed drive is engaged for a predetermined amount of time and for so long as the slider 55 is held depressed by the cam lobe.

Referring now to Figures 5 and 6, there is shown an alternative method of operating the trip lever 50. In this arrangement instead of positioning trip lever 50 inside the chamber 41 containing the fusible alloy, the trip lever or a part carried by the slider 55, is mounted on a rotatable stud or pin 80, the other end of stud 80 having fast thereon a serrated wheel 81 which is immersed in the fusible alloy in a housing 82 attached to a section of pipe 84 in the liquid circulating system.

What is claimed is:

1. Control means for automatically controlling a cyclic sequence of operations of a machine in which the proper performance of an operation is dependent upon a predetermined cycle time and existence of a predetermined temperature condition in the machine, said control means comprising a driven cycle timing element, a drive unit, variable speed gear change means operatively connecting said drive unit to said cycle timing element, means for normally conditioning said gear change means for transmitting drive from said drive unit to said cycle timing element at one drive ratio when said predetermined temperature condition exists, means responsive to existence of a temperature condition in the machine other than said predetermined temperature condition and operable in time with said cycle timing element for conditioning said gear change means for transmitting drive from said drive unit to said cycle timing element at a different drive ratio, a latch for retaining said gear change means in its said different drive ratio condition as long as the temperature condition in the machine is other than said predetermined temperature condition, and thermosensitive means for positively retaining said latch in latching position so long as the temperature condition in the machine is other than said predetermined temperature condition, said thermosensitive means being responsive to attainment of said predetermined temperature condition in the machine for releasing said latch and thereby enabling restoration of said gear change means to its condition for transmitting drive from said drive unit to said timing element at said one drive ratio.

2. Control means for automatically controlling a cyclic sequence of operations of a machine in which the proper performance of an operation is dependent upon a predetermined cycle time and existence of a predetermined temperature condition in the machine, said control means comprising a driven cycle timing element, a drive unit, variable speed gear change means operatively connecting said drive unit to said cycle timing element, means for normally conditioning said gear change means for transmitting drive from said drive unit to said cycle timing element at one drive ratio when said predetermined temperature condition exists, means operable in time with said cycle timing element for conditioning said gear change means for transmitting drive from said drive unit to said cycle timing element at a different drive ratio, releasable means operative for retaining said gear change means in its said different drive ratio condition, a member for holding said releasable means in retaining position, and a body of fusible material into which said member extends and which when solid holds said member against movement but which is fusible in response to attainment of said predetermined temperature in the machine for enabling movement of said member and releasing of said retaining means thereby to enable restoration of said gear change means to its condition for transmitting drive from said drive unit to said timing element at said one drive ratio.

3. In a washing machine adapted to be supplied with water at different temperatures and having a heating element for maintaining the water at a given temperature or raising it to that temperature, means for automatically controlling a predetermined series of operations in the washing cycle comprising a constantly driven control element, by which said operations are controlled, a main driving motor, drive connections between the motor and the control element including a variable speed drive unit capable of normal and low speeds, change speed shift means operated by the control element for effecting a change in the drive speed from normal to low at least once in the washing cycle, a latch device for holding the change speed shift means in low speed position, and heat sensitive means responsive to the temperature of the water in the machine for positively holding said latch in latching position so long as the temperature of the water is below said given temperature and responsive to rising of the temperature of the water above said given temperature for releasing said latch.

4. A washing machine as claimed in claim 3 in which the heat sensitive means comprises a fusible medium in thermal communication with the water in the machine and the latch device has a component which is held against displacement so long as the fusible medium remains in the solid state.

5. A washing machine as claimed in claim 4 including a chamber in which the fusible medium is housed, and comprising a trip element at least partly immersed in the medium within the chamber by means of which the latch device is retained in its operative position.

6. A washing machine as claimed in claim 4 in which the fusible medium comprises a fusible material of the group consisting of fusible metals and fusible alloys.

7. A washing machine as claimed in claim 3 in which the control means comprises a constantly revolving cam member having at least one element for engagement with the change speed shift means so that on displacement of said shift means by the cam element, the variable speed drive unit is moved from normal to low position.

8. A washing machine as claimed in claim 7 in which the variable speed drive unit is biased to the normal drive position.

9. A washing machine as claimed in claim 8 including a trip lever and in which the latch device comprises a lever member so arranged that on displacement of the change speed shift means, said lever member engages with said trip lever, which trip lever when the temperature is below normal is held against displacement by the fusible medium.

10. A washing machine as claimed in claim 9 in which the trip lever comprises a two-armed lever, one arm of the trip lever being immersed in the fusible medium and the other arm being adapted to engage the latch lever.

11. A washing machine as claimed in claim 10 including spring means by which the trip lever is biased so that said trip lever will normally return to its operative position for engagement with the latch lever.

12. A washing machine as claimed in claim 9 including a spindle on which the trip lever is fast, and a part on the spindle which is immersed in the fusible medium.

13. A washing machine as claimed in claim 9 in which the latch lever is directly actuated by the change speed shift means so that on displacement of the latter, the latch lever will be moved to a position to engage with the trip lever.

14. A washing machine as claimed in claim 13 in which the change speed shift means comprises a push rod for actuating the latch mechanism and in which displacement of the latch mechanism to engage the trip lever simultaneously causes shifting of the variable speed drive unit from normal to low position.

15. A washing machine as claimed in claim 14 in which the latch lever is pivotally carried by the push rod and is biased to a position where it will automatically disengage from the trip lever on release of the latter by the fusible medium.

16. A washing machine as claimed in claim 15 including a limit stop and wherein the latch lever comprises a three-armed lever pivotally mounted on the push rod and one arm of which cooperates with said limit stop, the second arm having a detent for engagement with the trip lever while the third arm is adapted to function as a manual control.

17. A washing machine as claimed in claim 16 comprising a control unit having a plurality of cam elements in which all of the cam elements are capable of effecting a displacement of the change speed shift means to cause engagement of low gear but certain of which cam elements are so arranged that their movement is insufficient to cause engagement of the latch lever.

18. A washing machine as claimed in claim 17 comprising a push rod having a resilient connection for engagement with the gear change means to compensate for difference in stroke between the latched and unlatched periods of low gear engagement.

19. A washing machine as claimed in claim 18 wherein the push rod comprises a spring actuated plunger for engagement with the gear shift change mechanism and so arranged as to accommodate the movement of the push rod when the latch lever is engaged.

References Cited in the file of this patent

UNITED STATES PATENTS

| | | |
|---|---|---|
| 2,328,073 | Hanney | Aug. 31, 1943 |
| 2,391,718 | Lindeman | Dec. 25, 1945 |
| 2,608,252 | Candor | Aug. 26, 1952 |
| 2,909,683 | Holzer | Oct. 20, 1959 |